US009696686B2

(12) United States Patent
Sticker et al.

(10) Patent No.: US 9,696,686 B2
(45) Date of Patent: Jul. 4, 2017

(54) METHOD AND DEVICE FOR FOCUSSING A MICROSCOPE AUTOMATICALLY

(71) Applicants: Carl Zeiss Microscopy GmbH, Jena (DE); Carl Zeiss AG, Oberkochen (DE)

(72) Inventors: Markus Sticker, Jena (DE); Jakow Konradi, Rottweil (DE); Peter Westphal, Jena (DE)

(73) Assignee: Carl Zeiss AG, Oberkochen (DE)

( * ) Notice: Subject to any disclaimer, the term of this patent is extended or adjusted under 35 U.S.C. 154(b) by 792 days.

(21) Appl. No.: 13/672,247

(22) Filed: Nov. 8, 2012

(65) Prior Publication Data

US 2013/0342673 A1 Dec. 26, 2013

(30) Foreign Application Priority Data

Nov. 9, 2011 (DE) ........................ 10 2011 086 018

(51) Int. Cl.
*G03H 1/04* (2006.01)
*G03H 1/00* (2006.01)
*G02B 21/36* (2006.01)
*G02B 21/24* (2006.01)
*G03H 1/08* (2006.01)

(52) U.S. Cl.
CPC ......... *G03H 1/0005* (2013.01); *G02B 21/244* (2013.01); *G02B 21/245* (2013.01); *G02B 21/367* (2013.01); *G03H 1/0443* (2013.01); *G03H 1/0866* (2013.01); *G03H 2001/005* (2013.01); *G03H 2001/0883* (2013.01)

(58) Field of Classification Search
CPC .. G02B 21/245; G02B 21/367; G02B 21/241; G02B 21/244
See application file for complete search history.

(56) References Cited

U.S. PATENT DOCUMENTS

| 2004/0105000 A1 | 6/2004 | Yuri |
| 2008/0137933 A1 | 6/2008 | Kim |
| 2009/0195688 A1 | 8/2009 | Henderson et al. |

FOREIGN PATENT DOCUMENTS

| DE | 195 37 376 A1 | 4/1996 |
| DE | 102 45 558 A1 | 4/2004 |

(Continued)

OTHER PUBLICATIONS

BJ RN Kemper et al: "Digital holographic microscopy for live cell applications and technical inspection", Applied Optics, Optical Society of America, Washington, DC; US, Bd. 47, Nr. 4, Feb. 1, 2008 (Feb. 1, 2008), Seiten A52-A61, XP007904218, ISSN: 0003-6935, DOI: 10.1364/AO.47.000A52.

(Continued)

*Primary Examiner* — Tony Ko
(74) *Attorney, Agent, or Firm* — Patterson Thuente Pedersen, P.A.

(57) ABSTRACT

A method for automatic focusing of a microscope with a microscope objective on a selected area of a specimen, in which a digital hologram of the selected area of the specimen is generated in an off-axis mode and a microscope with which the method is implemented. The digital hologram is used to determine, on the optical axis of the microscope objective, a focus position to be set in which the selected area of the specimen is optimally in focus. Subsequently, a control system is used to set the microscope to the focus position determined and thus is focused on the area selected.

14 Claims, 8 Drawing Sheets

(56) References Cited

FOREIGN PATENT DOCUMENTS

| | | |
|---|---|---|
| DE | 60 2004 005 338 T2 | 12/2007 |
| DE | 10 2007 003 059 A1 | 7/2008 |
| DE | 10 2007 033 793 A1 | 1/2009 |
| EP | 1 193 116 A1 | 3/2004 |
| WO | WO 2004/102111 A1 | 11/2004 |
| WO | WO 2007/144197 A1 | 12/2007 |

OTHER PUBLICATIONS

Liebling M et al: "Autofocus for digital Fresnel holograms by use of a Fresnelet-sparsity criterion", Journal of the Optical Society of America A, Optical Society of America, US, Bd. 21, Nr. 12, Dec. 1, 2004 (Dec. 1, 2004), Seiten 2424-2430, XP007911916, ISSN: 1084-7529, DOI: 10.1364/JOSAA.21.002424.

Patrik Langehanenberg et al: "<title>Autofocus algorithms for digital-holographic microscopy</title>", Proceedings of SPIE, Bd. 6633, Jul. 5, 2007 (Jul. 5, 2007), Seiten 66330E-66330E-9, XP055050837, ISSN: 0277-786X, DOI: 10.1117/12.727784.

Cuche E et al: "Simultaneous amplitude-contrast and quantitative phase-contrast microscopy by numerical reconstruction of Fresnel off-axis holograms", Applied Optics, Optical Society of America, Washington, DC; US, Bd. 38, Nr. 34, Dec. 1, 1999 (Dec. 1, 1999), Seiten 6994-7001, XP002313889, ISSN: 0003-6935, DOI: 10.1364/AO.38.006994.

Dubois et al., "Focus plane detection criteria in digital holography microscopy by amplitude analysis", Optics Express, vol. 14, No. 13, Jun. 26, 2006, 14 pages.

Langehanenberg et al., "Autofocusing in Digital Holographic Microscopy", © 3D Research Center, Kwangwoon University and Springer 2010, 9 pages.

Langehanenberg et al., "Automated three-dimensional tracking of Living cells by digital holographic microscopy", Journal of Biomedical Optics, Jan./Feb. 2009, 7 pages.

METHOD AND DEVICE FOR FOCUSSING A MICROSCOPE AUTOMATICALLY

This application claims the benefit of German Application No.: 102011086018.5, filed Nov. 9, 2011, entitled "Method and Arrangement for the Automatic Focusing of a Microscope" the contents of which are hereby incorporated by reference.

FIELD OF INVENTION

The invention relates to a method for the automatic focusing of a microscope with a microscope objective on a selected area of a specimen, in which a digital hologram of the selected specimen area is produced in an off-axis mode.

BACKGROUND OF INVENTION

The use of methods for the fully automatic recording of multimodal microscopical data records essentially contributes to the successful and efficient implementation of digital technologies in microscopy. It is only by using such automated microscopes that a great number of microscopical specimens can be digitized rapidly and efficiently. In digitization, specimens—e.g., tissue sections on specimen slides—are scanned across largish areas measuring 20×20 mm², for example. To ensure scanning with a high optical resolution—an area of 0.25 µm diameter in the specimen ought to correspond to one pixel on an array detector—, the object, or the area to be scanned, is optically divided into several smaller areas called tiles. These tiles are recorded one by one and assembled into what is called a tiled image. As a rule, however, the optimum focus position, i.e. the focus position in which the selected specimen area is focused best and imaged with the highest contrast, varies due to the specimen's topography, so that, with the focus position not being adapted, different areas are imaged with different sharpness, which mars the overall image.

The prior art discloses various methods for finding the best focus position during the automatic focusing of microscopes.

A long-established method of automatic focusing, i.e. the automatic setting of the best focus position, consists in varying the distance between the objective and the specimen surface, i.e. in shifting either the stage with the specimen or the objective along the optical axis of the objective or its elongation, which hereinafter is also called Z direction or Z axis. As a rule, distance variation is carried out in equidistant steps, with the image contrast being determined in each position. The position $z_{F'}$ of the specimen stage or objective corresponding to the distance at which the image contrast in the recorded image is greatest is then chosen as focus position. To further improve focusing, one can perform interpolation between the two distances having the highest image contrast, taking additional points into account, a method known as software autofocus. This method is very simple, but has the drawback of being dependent on object textures. This means that it does not work with textureless boundary surfaces, such as, e.g., a clean glass surface or a smoothly polished metal surface. In addition, this method is relatively slow, since a great number of distances or Z positions have to be approached and images to be recorded and analyzed in each position. This makes the method unfit for, e.g., live cells.

To automatically focus on featureless surfaces, one has to make use of an autofocusing method with active illumination, a procedure known as hardware autofocus, in which, in prior art, the autofocus sensor is implemented in various ways.

A first method is that of triangulation: A light beam—as a rule, a laser beam—is directed onto the specimen surface at an angle other than normal. At least part of the light beam is reflected by the specimen surface; the site of reflection varies as the specimen is shifted along the optical axis of the microscope objective in Z direction, which can be registered by a spatially resolving light detector. However, this method cannot be used with light-scattering specimens, as a rule. Moreover, the site at which the light beam of the laser is coupled into the microscope's beam path must be specifically matched with every objective, since microscope objectives feature greatly varying pupil diameters.

Another method makes use of a confocal sensor, which is described, e.g., in US 2008/002252 A 1: A light beam—again a laser beam, as a rule—is collimated and coupled into the objective pupil collinearly with the objective axis, so that it forms a point in the focal plane. On the image side, again a point will result if the specimen—an at least partially reflecting boundary surface provided—is located in the focal plane. The farther the specimen is moved away from the focal plane, the more the image-side point will expand. The intensity loss involved in the expansion can be used as an autofocus signal. To obtain directional information as well, one can, e.g., shade half of the laser beam cross-section in the collimated segment. Alternatively, one can couple the laser beam in an off-axis mode, i.e. so that it does not coincide with the optical axis. However, this method is very sensitive to reflexivity imperfections in the specimen's boundary surface reflecting the beam, such as dirt, scratches or fissures. Where high accuracy is of the essence, the capturing area is relatively small.

The same advantages also are inherent in another method also based on the use of a confocal sensor, in this case an astigmatic sensor. Here, a cylindrical lens is additionally arranged in the beam path, and the directional information can be obtained via the astigmatic aberration.

EP 1 393 116 B1 describes a method based on the use of a tilted confocal slit: A narrow light slit is imaged onto the specimen and detected on the image side with a linear sensor that is inclined relative to the optical axis by less than 90°. Where the light slit is imaged on the linear sensor in sharp focus, the intensity is highest. The directional information can be obtained from the intensity variation on the linear sensor. Alternatively, one can tilt the slit instead of the linear sensor. This method, too, makes use of the reflection of the light beam off a boundary surface of the specimen, and therefore is sensitive to imperfections in reflexivity such as dirt, scratches and fissures. Moreover, the adjustment of slit and linear sensor, which is critical for a correct measurement, is rather laborious.

WO 2007/144197 A1 describes an autofocus system based on a tilted camera with an array sensor: Instead of a light slit, a fine grid is imaged onto the specimen and, on the image side, detected by an array sensor such as used in digital cameras, which is inclined relative to the optical axis by less than 90°. Alternatively, the grid can be inclined, and it may also be implemented as a slit pattern. What is exploited here is not primarily the intensity distribution on the sensor but rather the contrast of the grid image. This method is less sensitive to imperfections such as dirt or scratches, but greatly scattering specimens are a problem here, too, as they cannot be correctly focused on.

Another method, which is relatively fast but needs a highly complex arrangement, is based on optical coherence tomography (OCT) and a sensor designed therefore. It is an interferometric method, in which an amplitude-modulated scan (also known as A scan) is made by traversing along the Z direction at high speed and analyzing where the short-coherence radiation source creates interferences. Alternatively, the so-called Fourier domain method can be used, which works without moving parts. In this way, both light-reflecting and light-scattering specimens can be detected. As a disadvantage, this method is very sensitive to length variations in the reference beam path as well as to changes of dispersion, e.g. when objectives are changed.

SUMMARY OF THE INVENTION

A method that has been gaining ground recently is known as digital holographic microscopy, which is used for subsequent numerical focusing on a recorded object. For the holographic record, the object is illuminated or transilluminated with coherent light. The light reflected or diffracted by the object or specimen—known as object beam or object wave—is coherently superposed with a reference beam, also known as reference wave. The spatial interferogram thus generated is detected.

In classical holography, the interferogram is stored on a photographic plate. The intensity distribution of the interferogram stored there contains the complete information of the wave field scattered by the specimen. A reconstruction of the hologram is obtained by illuminating the hologram with a reference wave. The diffraction of the illuminating light at the interference pattern stored on the photographic plate creates a wave front, which is identical to the object light beam, i.e. the object wave coming from the specimen.

Instead of a photographic plate, digital holography uses a digital image sensor, e.g., a CCD or CMOS sensor, to record the interference pattern, which is then reconstructed by computation. With digital holography used in microscopy, a simultaneous quantitative imaging of the phase contrast of several focal planes with a resolution of down to 5 nm along the optical axis Z is made possible. If the specimen is not in the focal plane of the microscope objective, the best possible focus position can be determined from the holographically obtained data record. This makes numerical refocusing on the specimen possible. This, then, is a numerical method for automatic focusing in which refocusing on the specimen is effected numerically in such a way that the image of the specimen in the focal plane of the microscope objective is computed from the pre-recorded holographic image and displayed.

The problem of the invention is to develop a fast auto-focusing method that can be used for both textured and textureless specimens and is more robust than the methods known in prior art.

In a method of the kind described above, this problem is solved in such a way that, by application of the digital hologram, a focus position on the optical axis Z of the microscope objective is determined in which the selected specimen area is optimally in focus. Subsequently, the microscope is set, via a control system, to the previously determined focus position, e.g., by moving the stage with the specimen until the selected area is in focus. For microscopical imaging, then, preferably other methods (common in prior art and independent of digital holography) are used, since digital holography generally features a restriction in lateral optical resolution.

Taking a single digital-holographic record is sufficient to determine the best possible focus position in the selected area, because it already contains the complete depth information of the selected specimen area in the appropriately selected resolution, which is sufficient for determining the focal plane. In case the specimen contains information from different depth positions, these can also be determined by this method. The method does not require scanning along the Z direction, a fact that makes it considerably faster. Unlike other interference methods, this method does not require matching the optical path lengths. Moreover, this method can be implemented irrespective of the configuration of the microscope, as it is applicable for both reflected-light and transmitted-light microscopes, and it permits focusing on both phase and amplitude objects. Furthermore, it is not necessary to keep the interferometric superposition stable for some greater length of time; a relatively short time covering the exposure time is sufficient. During the computation and setting of the focus position and the subsequent recording of an image, there is no need to maintain stability; the partial system for recording the digital hologram can then be turned off.

As the invented method does not require the complex process of scanning along the Z direction, this method is especially suitable for the automated recording of multi-modal microscopical data records. In a particularly preferred embodiment of the method, therefore, the determination of the focus position and subsequent focusing are performed sequentially for several selected areas. In this process, a partial image is recorded for each area in the best possible focus position determined and set as described above. The partial images are then assembled to form a total image. It is possible to assemble the partial images to form a tiled image, i.e. an image consisting of a number of tiles, all of which cover an area of approximately 4 $cm^2$ of the specimen. In case of transparent specimens it is possible, in addition, to focus on different layers in the specimen, so that a stack of images along the optical axis Z can be generated. It is self-evident that both procedures can be used in combination.

Creating the digital hologram requires light of a coherent light source. For this, one can use, e.g., a laser emitting light of a defined focusing wavelength. By means of a beam splitter, the light is split up into an object beam and a reference beam, each of which is separately coupled into the microscope, e.g., via a glass fiber. The object beam, once coupled into the microscope, is directed onto the specimen and from there onto a focusing sensor. It is understood that the object beam first penetrates the microscope objective and after this is uncoupled from the microscope beam path again, whereas the reference beam is directed onto the focusing sensor directly. The focusing sensor may, e.g., be part of a CCD or CMOS camera. The reference and object beams are then superimposed, and the intensity distribution of the interferogram resulting therefrom due to the wavelength properties of the light is detected. In addition, the intensity distribution of the object beam and that of the reference beam are detected and stored separately. The superposition of object beam and reference beam is effected in an off-axis mode: the reference beam is directed onto the focusing sensor at a small angle relative to the direction of the object beam, which equals a line perpendicular to the sensor; as a result, reference beam and object beam no longer arrive from the same direction. This increases the accuracy of the subsequent analysis, as the reference beam is less disturbing. In this way, the complete spatial information can be extracted from a single hologram.

For determining the best possible focus position it is expedient to analyze the amplitude of the intensity, integrated across the plane of the focusing sensor, as a function of the position on the optical axis Z, with regard to the presence of extrema. In other words, the spatially integrated amplitude of the individual object planes is determined in discrete steps as a function of the focus position. If this function has an extremum, this constitutes a best possible focus position. If the specimen is a pure amplitude object, the integrated amplitude adopts a minimum; if the specimen is a pure phase object, the integrated amplitude adopts a maximum. This also applies to specimens with combined properties; in this case the procedure depends on how these specimens are to be examined. As the focus position to be set on the optical axis Z, one will select and set the position in which the integrated amplitude adopts an extremum.

In principle, the same light used for recording the digital hologram can also be used for illuminating the specimen for observation, and especially for image recording by a method other than digital holography, which permits users to save on components. Greater flexibility in application, however, can be achieved if one chooses at least one illuminating wavelength (used to illuminate the specimen for observation) to be different from the focusing wavelength. The same is true for a range of illuminating wavelengths, with which the specimen can be illuminated in a broader spectral band. The user than is not restricted to the single focusing wavelength but can observe the specimen also in other wavelength ranges that permit, e.g., observation that is more agreeable to the eye or can be combined with other analytical methods. It is obvious that the focusing wavelength may also lie within the range of illuminating wavelengths.

For the invented digital-holographic autofocusing method on the one hand and for imaging including image recording in the context of specimen observation on the other, one may use either different or identical illumination sources. Light of the focusing wavelength is used for focusing on the specimen; light of the illuminating wavelength or of wavelengths out of the range of illuminating wavelengths is used to illuminate the specimen for observation.

Preferably, the selected area of the specimen is illuminated simultaneously with light of the focusing wavelength and light of the illuminating wavelength or of the range of illuminating wavelengths, so that automatic focusing can be effected during observation. In this way one does not need to switch back and forth between automatic focusing and image recording, which accelerates the procedure if, e.g., several tiles are to be recorded. The analysis of the digital diagram in the way described above can be done with the aid of modern processors at great speed so that delays will hardly occur.

The method described above is suitable for both transmitted-light and reflected-light microscopy. In either case, the object beam is directed first onto the specimen and then into a detection beam path of the microscope. In the detection beam path there is the microscope objective, through which the diffracted object beam is transmitted. Subsequently, the object beam is uncoupled from the microscope beam path and directed onto the focusing sensor. In a reflected-light microscope, the object beam, before it hits the specimen, is coupled into an illuminating beam path of the microscope. Via this illuminating beam path of the microscope, the specimen is also illuminated with illuminating light of an illuminating wavelength or of a range of illuminating wavelengths. The object beam is coupled into this beam path before it is directed onto the specimen.

The invention also relates to a microscope that is especially suitable for implementing the method described above. It permits the specimen to be observed by the reflected-light or transmitted-light method, i.e. it may be a transmitted-light or reflected-light microscope. Irrespective of whether it is a reflected-light or transmitted-light microscope, illumination of the specimen with the object beam can be effected by the reflected-light or transmitted-light method. Ideally, both methods can be implemented in one and the same microscope by suitable configuration of the beam paths and of the autofocusing unit for recording and, suitable means provided, analyzing the digital hologram.

Such a microscope that is especially suitable for implementing a method as described above is first provided with autofocusing means for the automatic focusing of a microscope objective on a selected area of the specimen. It further comprises means for generating a digital hologram of the selected area, with the digital hologram being generated in an off-axis mode. The microscope further comprises means for analyzing the digital hologram in such a way that the position of the best possible focus position along the optical axis Z of the microscope objective is determined in the selected area. This analysis can be effected with the aid of methods for the analysis of digital holograms, methods that are known in prior art and are also used for numerical refocusing. Finally, the microscope comprises means for control, by which the predetermined best possible focus position is set on the microscope.

The result of the analysis, viz., the site of the best possible focus position, is transmitted to the control system, which then adjusts the height (in Z direction) of the specimen stage, which may e.g., be a mechanical stage until the correct focus position is reached. Alternatively, the height of the objective can be adjusted.

Although in principle the digital hologram and the normal illumination of the specimen for observation can use the same light source, i.e. the same light wavelength, the microscope will gain in flexibility and applicability if it comprises both a focusing light source emitting coherent focusing light of a focusing wavelength, and an illuminating light source intended for illuminating the specimen with illuminating light of least one illuminating wavelength or with light of at least one illuminating wavelength range, with illumination being delivered via an illuminating beam path. This does not exclude the case that the focusing wavelength lies, e.g., in the range of illuminating wavelengths. In this case one can, e.g., for recording the digital hologram, switch off the illuminating light source for a short time, or the respective beam path can be made non-transmitting to the illuminating light by suitable means such as filters etc. In case illuminating wavelength and focusing wavelength are identical, one can separate them by way of their polarizations.

For generating the digital hologram, it is expedient for the microscope to be provided with means for splitting up the focusing light into an object beam and a reference beam. The object beam is used to illuminate the specimen with focusing light. The reference beam is immediately directed onto a focusing sensor, which is intended for the detection of the intensities of object beam, reference beam and the interferometrically superimposed object and reference beams. It is further expedient for the microscope to comprise means for uncoupling the object beam coming from the specimen from a detection beam path of the microscope after the light beam has passed through the microscope. Once uncoupled, the object beam is directed onto the focusing sensor.

In case that the generation of the digital hologram is to be effected by the reflected-light method, the microscope is provided, in addition, with means for coupling the object beam into the microscope's illuminating beam path, via which the specimen receives the illuminating light.

The means for uncoupling the object beam and, where provided or necessary such as for the reflected-light method, the means for coupling the object beam in, can be configured in various favorable ways. If the focusing wavelength and the illuminating wavelength differ, or if the focusing wavelength lies within the range of illuminating wavelengths, it is of advantage to use dichroic mirrors for coupling and uncoupling. The filter function of the dichroic mirrors is adapted to the spectral characteristics of the focusing light and of the illuminating light, thus enabling the focusing light to be coupled in and uncoupled in an efficient way. As, in this case, the illuminating beam path is at least partially identical to the detection beam path, the respective dichroic mirror must be designed in such a way that light is detected in a certain detection wavelength or detection wavelength range, which may differ from the illuminating wavelength or the illuminating wavelength range.

Alternatively, one can use polarizing beam splitters, in which case the focusing light and the illuminating light should be polarized in directions normal to each other. This way affords greater flexibility with regard to the selection of wavelengths or wavelength ranges for focusing, illumination and detection.

It is understood that the features mentioned before and those to be explained below, as well as the features specified in the claims, are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying drawings, which also disclose features essential to the invention, and in which.

Figure 1:
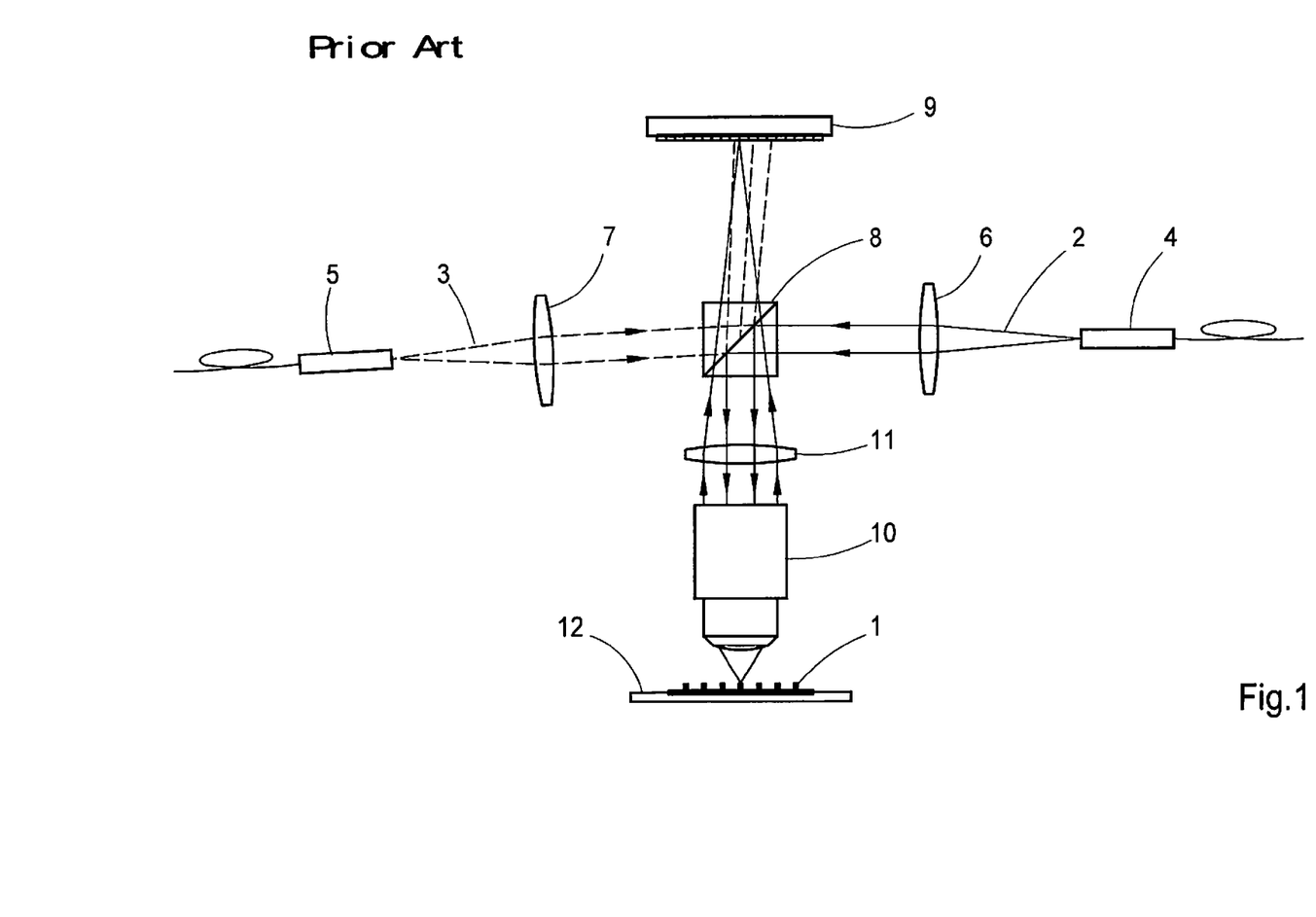
FIG. 1 shows a known arrangement for recording a digital hologram by the reflected-light method.

FIG. 1 shows the basic setup of a digital-holographic microscope used for recording a digital hologram of a specimen 1 or an area thereof. The analysis is effected numerically. Refocusing with this system is effected exclusively numerically as well. The digital-holographic microscope shown here is implemented in a reflected-light configuration. Light of an external or internal coherent radiation source—as a rule, a laser, which is not shown here—is split up into an object beam 2 and a reference beam 3 by means of a beam splitter (not shown either); both are coupled into the microscope separately via a glass fiber 4 or 5, respectively. Here and in the following drawings, the reference beam 3 is represented by dashed lines, and the object beam by solid lines. Beam shaping is effected by imaging optical elements 6 and 7.

The reflected-light configuration shown in FIG. 1 is based on a modified Michelson interferometer. Object beam and reference beam, coming from opposite directions, are directed onto a common beam splitter 8 along two opposite interferometer arms. The beam splitter 8 directs the parallel wave front of the reference beam 3 towards a focusing sensor 9, which may be, e.g., the digital image sensor of a CCD or CMOS camera. The object beam 2 is directed in the opposite direction onto the specimen 1, which in this case reflects the light or most of it. To make a microscopical record of a selected area of the specimen 1, a combination of a microscope objective 10 and a tube lens 11 is used. In this way, the object wave of the object beam 2, diffracted by the specimen and represented by arrows pointing away from the tube lens 11 in the direction of the beam splitter 8, is collected and imaged on the detection area of the focusing sensor 8.

The specimen 1 rests on a computer-controlled mechanical stage 12, so that it can be positioned as required as well as scanned part by part, e.g., in the format of small tiles. Alternatively, the mechanical stage 12 may be controlled manually instead. The object beam 2 reflected off the specimen 1 passes through the beam splitter 8 and is, on the detection area of the digital focusing sensor 9, superimposed coherently with the reference beam 3. This superimposition is effected in an off-axis mode, so that the reference beam 3 hits the focusing sensor 9 along a direction that includes an angle different from zero with the perpendicular to the sensor or the direction of the object beam 2 corresponding to that perpendicular. In principle, the said angle can be chosen to have any site between 0° and 90°; however, resolution will decrease with increasing angle. Therefore it is of advantage to choose a small angle in the range of up to 20°. The intensity distribution of the interferogram resulting from this superimposition is detected and recorded in the image plane of the focusing sensor 9 together with the intensity distributions of the pure object beam 2 and/or the pure reference beam 3.

Figure 2:
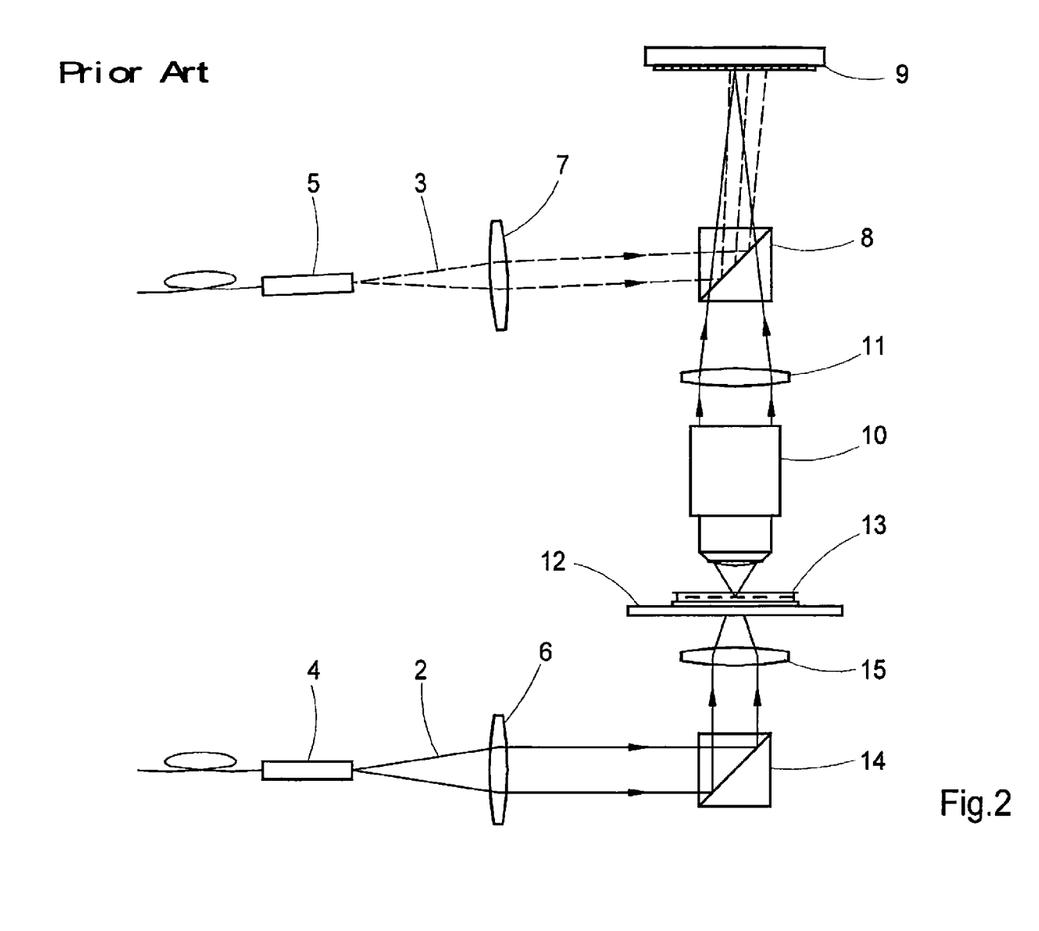
FIG. 2 shows a known arrangement for recording a digital hologram by the transmitted-light method.

FIG. 2 shows an arrangement similar to FIG. 1, which is also known in prior art. Unlike the digital-holographic reflected-light microscope in FIG. 1, however, FIG. 2 shows a digital-holographic transmitted-light microscope. Other than in FIG. 1, where the object beam 2 coming from the specimen is reflected off the specimen 1, here the object beam 2 is diffracted by a transparent specimen 13. For that purpose, the object beam 2 is coupled into the illuminating beam path of a transmitted-light microscope via a beam splitter 14, e.g., a polarizing beam splitter. The specimen is illuminated by means of a condenser lens 15, which permits the best possible illumination of the microscope objective 10 by the object wave of the object beam 2 emanating from the specimen 13. As in FIG. 1, the said object wave passes through the tube lens 11 and is, by means of the beam splitter 8, superimposed coherently with the reference beam 3 on the detection area of the focusing sensor 9. Analysis is effected in accordance with the procedure described for FIG. 1.

The arrangements shown in FIGS. 1 and 2 can be integrated into reflected-light or transmitted-light microscopes, e.g., in the form of modules.

Figure 3:
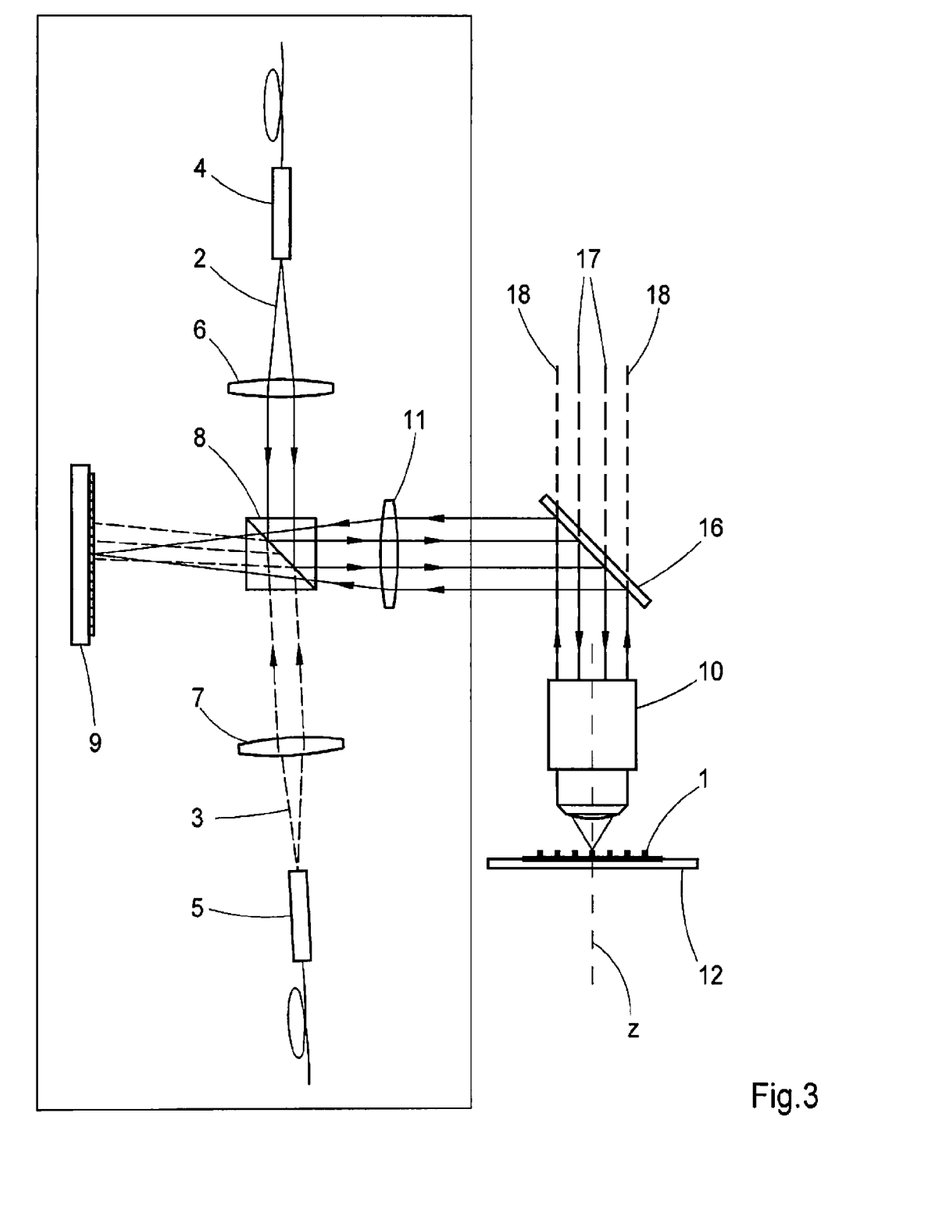
FIG. 3 shows a first embodiment of a microscope with automatic focusing based on a digital hologram.

FIG. 3 shows a microscope configured as a reflected-light microscope; for the sake of clarity, however, the illuminating and detection beam paths and the associated optical components and means of detection have been left out as far as possible, while they are part of such a microscope, of course. The microscope is provided with autofocusing means for the automatic focusing of the microscope objective 10 on a selected area of the specimen 1. The means for automatic focusing in the reflected-light configuration, described in connection with FIG. 1, are shown here integrated in a module inside a box. The microscope thus comprises means for generating a digital hologram of the selected area of the specimen 1, with the hologram being generated in an off-axis mode. It further comprises means for analyzing the digital hologram in such a way that, along the optical axis Z of the microscope objective or its elongation, the site of the best possible focus position in the selected area is determined. In other words, the focus position to be set on the optical axis Z in which the selected area is optimally in focus is determined by means of the digital hologram. Optimally means that the best focus position is set according to the numerical result. This may slightly deviate from the actually best possible focus position. For generating the digital hologram, as described above, focusing light of a coherent focusing light source with a focusing wavelength is split up into the object beam 2 and the reference beam 3. To determine the best possible focus position, the amplitude of the intensity, integrated across the plane of the focusing sensor 9 as a function of the position on the optical axis Z, is analyzed with regard to the presence of extrema. As a rule, this is effected at sampling points in discrete steps, with interpolation being feasible to find the very best possible focus position. The focus position to be set on the optical axis Z, one selects the respective extremum. For the best possible focus position, the spatially integrated amplitude of the respective plane adopts a minimum in case the specimen is a pure amplitude object, and a maximum if it is a phase object. Though means for control, the microscope then gets set to the best possible focus position determined, i.e. it gets focused on the area selected.

The microscope embodiments shown in FIG. 3 and the subsequent figures are all provided with means for uncoupling the object beam 2 sent by the specimen from a detection beam path of the microscope once the said object beam 2 has passed through the microscope objective 10, and for directing that object beam onto the focusing sensor 9. The reflected-light microscope shown in FIG. 3 is further provided with means for coupling the object beam 2 into the illuminating beam path of the microscope.

In the present case, the means for coupling and uncoupling the object beam 2 are identical and comprise a dichroic mirror 16. Whereas the light of the focusing wavelength of the object beam 2 is reflected off the dichroic mirror 16, the illuminating light 17, which consists of an illuminating wavelength or a range of illuminating wavelengths, is emitted by an illuminating light source and illuminates the specimen via an illuminating beam path, is transmitted by the mirror 16 without hindrance. The detection light 18 reflected by the specimen is also transmitted by the dichroic mirror 16 without hindrance. Thus, the filter function of the mirror is adapted to the spectral characteristics of the light sources used and to the detection. The object beam 2, then, is coupled into the microscope's illuminating beam path, via which the specimen 1 is illuminated with light of the illuminating wavelength or of the range of illuminating wavelengths. The object beam 2 is then directed onto the specimen 1 and subsequently into the microscope's detection beam path, passes through the microscope objective 10, is then uncoupled from the detection beam path and directed onto the focusing sensor 9. In the case of the reflected-light microscope shown, the detection and illumination beam paths are, in part, identical. If the beam splitter used is a dichroic mirror 16, it is expedient to select a focusing wavelength that is different from the illuminating wavelength or lies outside the range of illuminating wavelengths. Illumination with illuminating light and illumination by the object beam 2 with light of the focusing wavelength can take place simultaneously, so that automatic focusing can be effected during observation, and the image can be recorded immediately after automatic focusing.

Determining the focus position and subsequent focusing for several selected areas of the specimen can be effected sequentially, with a partial image being recorded for each area at the focus position determined and set for it, and the partial images being assembled to form a total image. If the partial images are tiles of an image lying in one plane, they can be assembled to form an image in a plane that is normal to the optical axis Z. In each tile, then, the best possible focus position for the respective area is set, so that a uniformly high quality of image definition is ensured throughout the total image. With transparent specimens it is also possible, in principle, to create an image stack of partial images taken along the optical axis Z.

Figure 4:
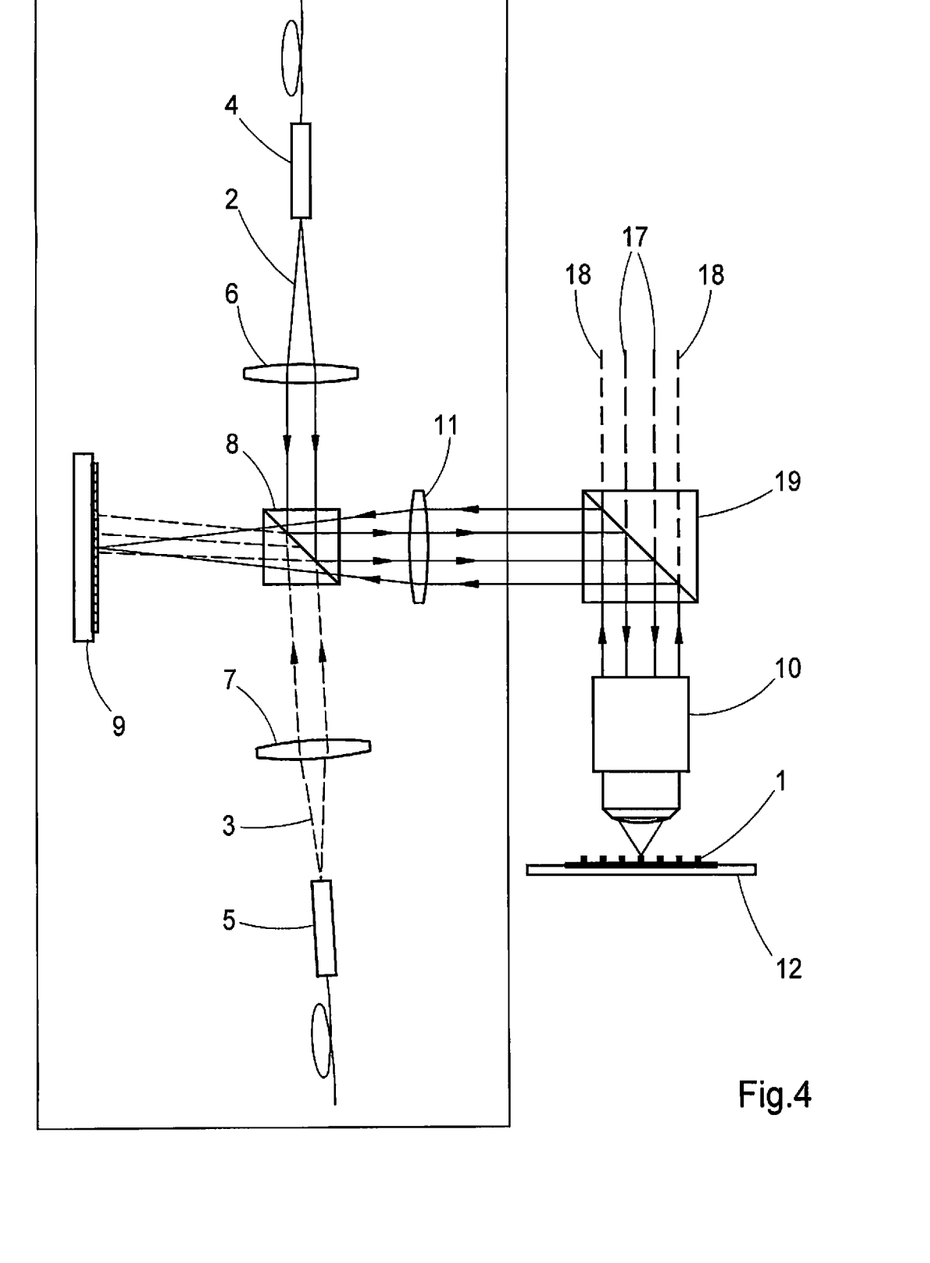
FIG. 4 shows a second embodiment of such a microscope.

FIG. 4 shows a modification of the arrangement shown in FIG. 3. Here, coupling and uncoupling the object beam 2 into or from the illumination and detection beam path of the microscope is effected by means of a polarizing beam splitter 19. For this, the object beam 2 and the illuminating light 17 are given polarization directions that are mutually perpendicular.

It is then possible, in principle, to use one and the same wavelength for illumination and focusing.

Figure 5:
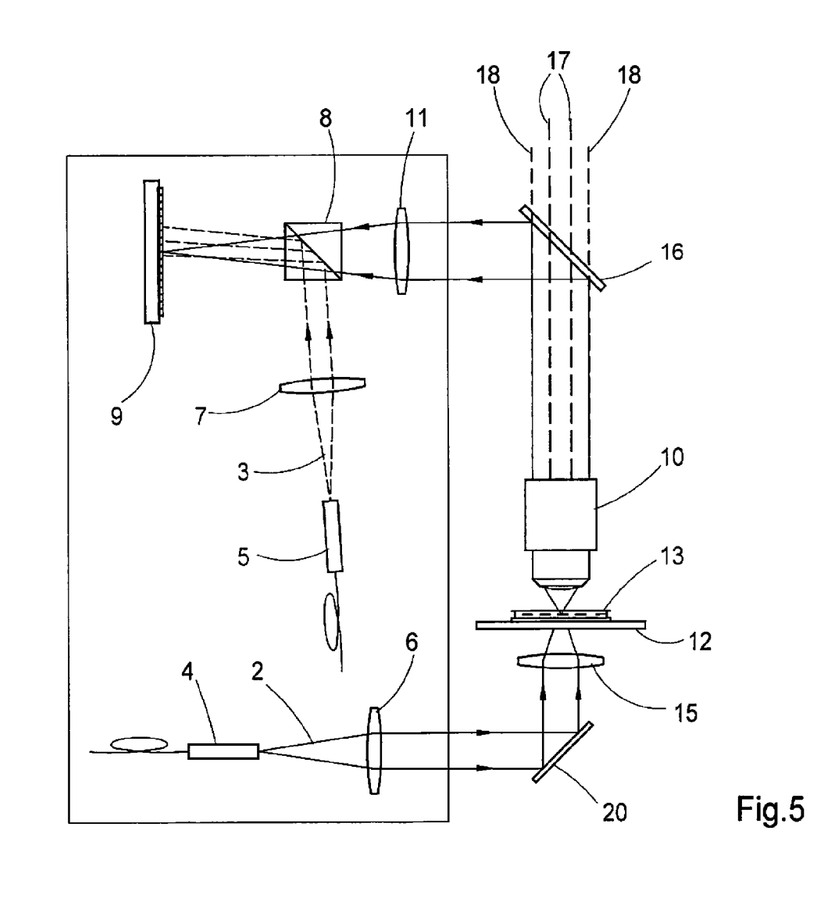
FIG. 5 shows a third embodiment of such a microscope.

In FIG. 5, the automatic focusing setup is also used with a reflected-light microscope, but here, the specimen 13 to be examined is transparent. Automatic focusing is effected by the transmitted-light method as described in connection with FIG. 2. The object beam 2 is directed towards the transparent specimen 13 by means of a mirror 20. The illumination of the microscope objective 10 can be optimized by means of the condenser lens 15. To uncouple the object beam 2 diffracted by the specimen 13 from the common illumination and detection beam path of the microscope, use is made of a dichroic mirror 16 as described in connection with FIG. 3.

Figure 6:
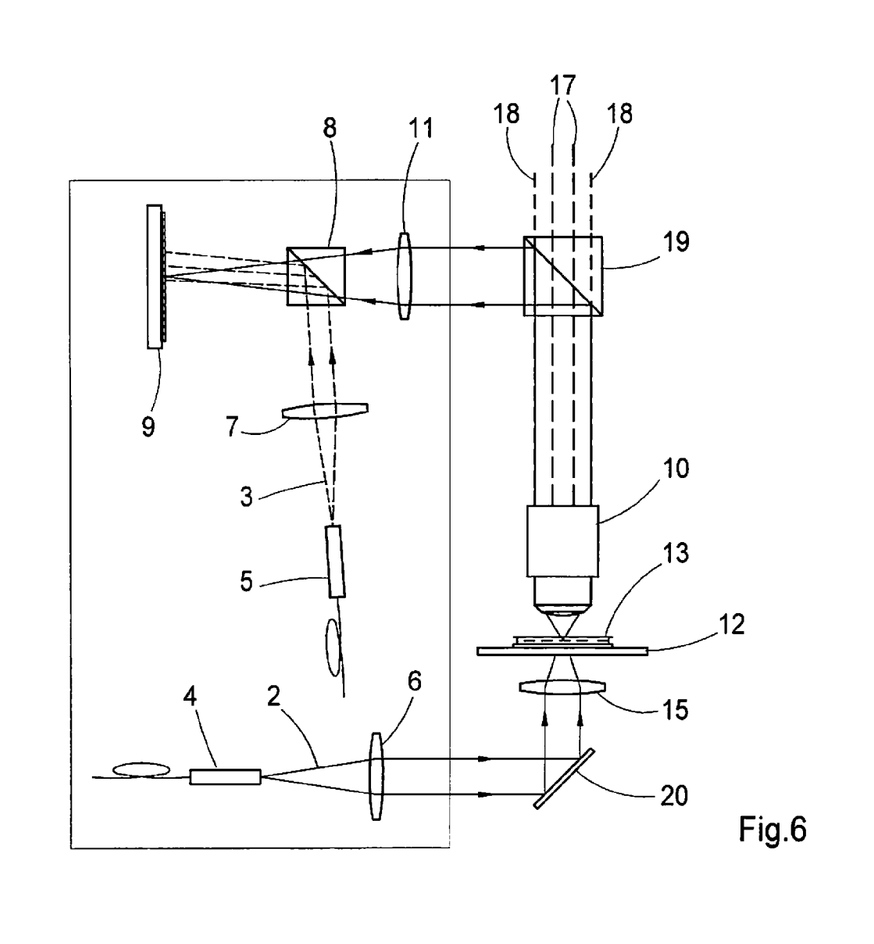
FIG. 6 shows a fourth embodiment of such a microscope.

FIG. 6 shows a modification of the arrangement shown in FIG. 5, in which the dichroic mirror has been replaced with a polarizing beam splitter 19, provides other possibilities and necessities of setting with regard to the focusing light and the illuminating light, as already described before.

Figure 7:
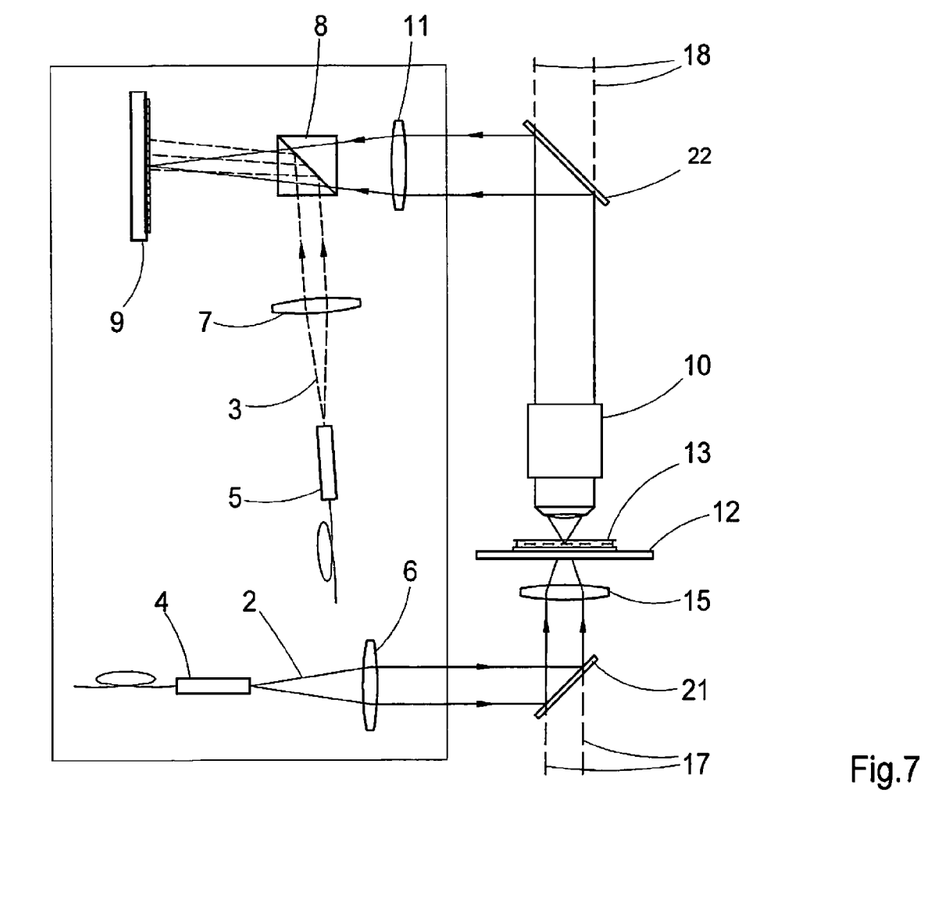
FIG. 7 shows a fifth embodiment of such a microscope.
Figure 8:
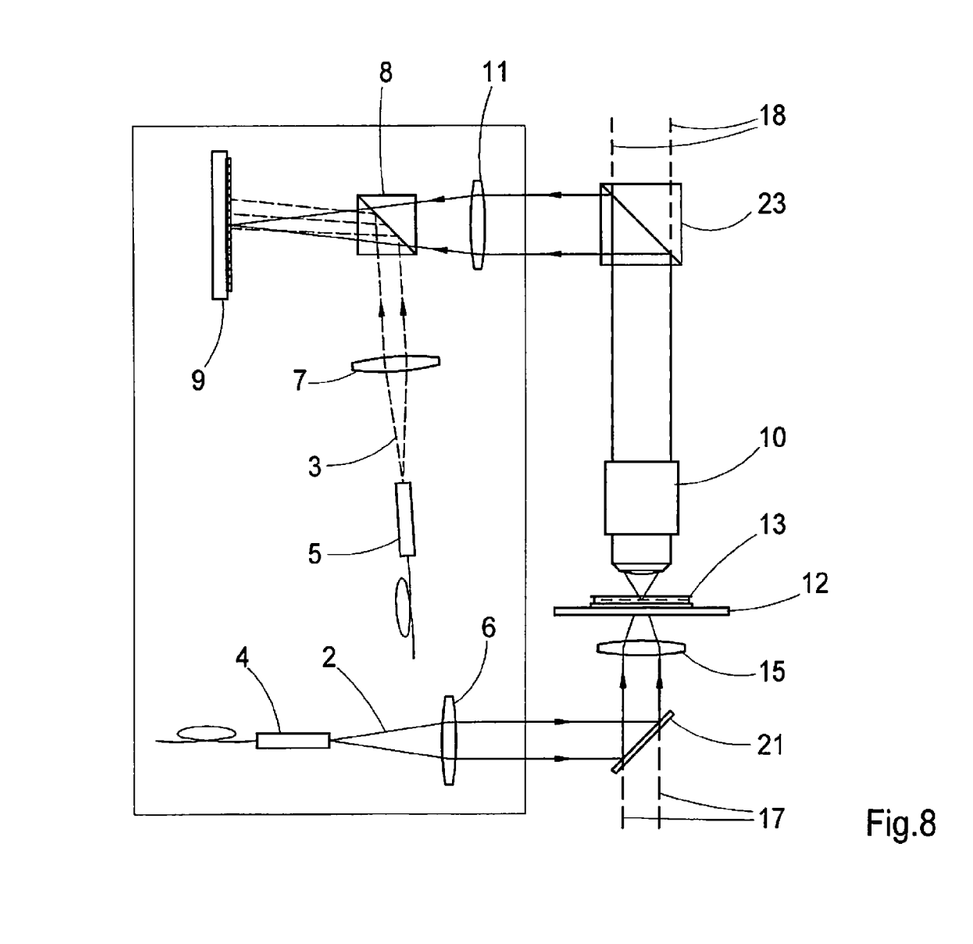
FIG. 8 shows a sixth embodiment of such a microscope.

In the microscope shown in FIG. 7, both the microscope unit and the focusing unit are conceived to implement the transmitted-light method. For coupling the object beam 2 into the illuminating beam path, a dichroic mirror 21 is used instead of a normal mirror. Uncoupling from the microscope's detection beam path is effected by means of another dichroic mirror 22, or, as shown in FIG. 8, by means of a polarizing beam splitter 23.

By means of the method described before and the microscopes used for it, it is possible to find the best possible focus position of a selected image area of the specimen, based on the analysis of a digital hologram of this area. There is no need to perform any scanning as required in prior art, because a single digital-holographic record contains the complete depth information of this specimen area in a resolution that is sufficient for determining the focal plane. Unlike other interference methods, the procedure described does not necessitate and matching of optical path lengths, which makes this method more robust than those known in prior art. Stability of the interferometric superimposition is required only for the time it takes to record the digital hologram.

LIST OF REFERENCES

1 specimen
2 object beam
3 reference beam
4, 5 glass fibers 6, 7 optical elements
8 beam splitter
9 focusing sensor
10 microscope objective
11 tube lens
12 mechanical stage
13 specimen
14 beam splitter
15 condenser lens
16 dichroic mirror
17 illuminating light
18 detection light
19 polarizing beam splitter
20 mirror
21, 22 dichroic mirrors
23 polarizing beam splitter

What is claimed is:

1. A method for automatic focusing of a microscope with a microscope objective on a selected area of a specimen, comprising:
producing a digital hologram of the selected area of the specimen in an off-axis mode prior to or during microscopic imaging, wherein the microscopic imaging is accomplished by an imaging method other than digital holography;
determining a focus position to be set on an optical axis of the microscope objective by analysis of the digital hologram prior to or during the microscopic imaging;
the focus position being, a position in which the selected area of the specimen is optimally in focus, and
setting a position, by application of a control system, of a stage, a position of an objective lens of positions of both the stage and the objective lens of the microscope to the focus position that is determined by the analysis of the digital hologram, and, thereby, focusing the microscope on the area selected.

2. The method as claimed in claim 1, further comprising;
performing the determination of the focus position and subsequent focusing on several selected areas of the specimen sequentially;
recording a partial image of each area at the focus position determined and set; and
assembling the partial images to form a total image.

3. The method as claimed in claim 1, further comprising assembling the partial images to form an image stack along the optical axis, an image in a plane normal to the optical axis or both.

4. The method as claimed in claim 1, further comprising:
for generating the digital hologram, splitting focusing light of a coherent focusing light source with a focusing wavelength into an object beam and a reference beam;
directing the object beam onto the specimen and from the specimen onto a focusing sensor;
directing the reference beam onto the focusing sensor immediately;
detecting intensities of the reference beam and the object beam separately;
detecting an intensity of the superimposition of reference beam and object beam on the focusing sensor, and
in determining the best possible focus position, analyzing the amplitude of the intensity, integrated across the plane of the focusing sensor as a function of the position on the optical axis, with regard to the presence of extreme and as a function of the focus position to be set on the optical axis, and
in a case that the specimen is an amplitude object, selecting a position in which the integrated amplitude is a minimum, and
in a case that the specimen is a phase object, selecting a position in which the integrated amplitude is a maximum.

5. The method as claimed in claim 4, further comprising directing the object beam onto the specimen and into a detection beam path of the microscope and, uncoupling the object beam that has passed through the microscope objective from the detection beam path and directing the object beam onto the focusing sensor.

6. The method as claimed in claim 5, further comprising coupling the object beam into an illuminating beam path of the microscope, via which the specimen is illuminated with illuminating light of the illuminating wavelength or of the range of illuminating wavelengths, before the said object beam is directed onto the specimen.

7. The method as claimed in claim 1, further comprising selecting a focusing wavelength and at least one illuminating wavelength or at least one range of illuminating wavelengths for illuminating the specimen to be different from each other.

8. The method as claimed in claim 7, further comprising illuminating the selected area of the specimen simultaneously with light of the focusing wavelength and light of the illuminating wavelength or of the range of illuminating wavelengths, so that automatic focusing can be effected during observation.

9. An autofocusing transmitted light or reflected light microscope for automatic focusing of a microscope objective on a selected area of a specimen, comprising:
means for generating a digital hologram of the selected area in an off-axis mode prior to or during microscopic imaging, wherein the microscopic imaging is accomplished by an imaging method other than digital holography;
means for analyzing the digital hologram in such a way that a position of a best possible focus position in the selected area is determined along the optical axis of the microscope objective prior to or during the microscopic imaging; and
a controller that sets the previously determined best possible focus position of a stage, an objective lens or both the stage and the objective lens of the transmitted light or reflected light microscope based on analysis of the digital hologram that is performed by the means for analyzing the digital hologram.

10. The microscope as claimed in claim 9, further comprising:
a focusing light source emitting a coherent focusing light of a focusing wavelength, and
at least one illuminating light source that illuminates the specimen with illuminating light of at least one illuminating wavelength or light of at least one range of illuminating wavelengths via an illuminating beam path.

11. The microscope as claimed in claim 10, further comprising
means for splitting the focusing light into an object beam that illuminates the specimen with focusing light, and a reference beam,
a focusing sensor that detects intensities of an object beam, a reference beam and a superimposition of the object beam and the reference beam, and
means for uncoupling the object beam coming from the specimen from a detection beam path of the microscope after the object beam has passed through the microscope objective, and for directing the object beam onto the focusing sensor.

12. The microscope as claimed in claim 11, wherein the means for uncoupling the object beam comprises a dichroic mirror or a polarizing beam splitter.

13. The microscope as claimed in claim 10, further comprising means for coupling the object beam into the illuminating beam path of the microscope via which the specimen is illuminated also with illuminating light.

14. The microscope as claimed in claim 13, wherein the means for coupling the object beam in, comprises a dichroic mirror or a polarizing beam splitter.

* * * * *

UNITED STATES PATENT AND TRADEMARK OFFICE
CERTIFICATE OF CORRECTION

PATENT NO. : 9,696,686 B2
APPLICATION NO. : 13/672247
DATED : July 4, 2017
INVENTOR(S) : Markus Sticker et al.

Page 1 of 1

It is certified that error appears in the above-identified patent and that said Letters Patent is hereby corrected as shown below:

In the Specification

Column 7, Line 46, please insert the heading --Detailed Description--

In the Claims

Column 11, Line 34, delete second occurrence of "of" and insert --or--

Signed and Sealed this
Twenty-seventh Day of March, 2018

Andrei Iancu
*Director of the United States Patent and Trademark Office*